United States Patent [19]

Rodenkirch

[11] 4,262,725
[45] Apr. 21, 1981

[54] POLYESTER INSERTS IN SINGLE-PLY RADIAL TIRES

[75] Inventor: Bruce L. Rodenkirch, Cuyahoga Falls, Ohio

[73] Assignee: The General Tire & Rubber Company, Akron, Ohio

[21] Appl. No.: 84,476

[22] Filed: Oct. 15, 1979

Related U.S. Application Data

[63] Continuation-in-part of Ser. No. 835,383, Sep. 21, 1977, abandoned.

[51] Int. Cl.³ .......................... B60C 9/08; B60C 9/20
[52] U.S. Cl. .......................... 152/354 R; 152/356 R; 152/359; 152/361 R; 152/361 DM
[58] Field of Search ............ 152/354 R, 354 RB, 355, 152/356, 357 R, 359, 361 R, 361 FP, 361 DM

[56] References Cited

U.S. PATENT DOCUMENTS

| | | | |
|---|---|---|---|
| 2,493,614 | 1/1950 | Bourdon | 152/361 R |
| 2,958,359 | 11/1960 | Boussu et al. | 152/361 X |
| 2,976,905 | 3/1961 | Bezkadolph | 152/354 |
| 2,990,870 | 7/1961 | Vittorelli | 152/356 |
| 3,192,984 | 7/1965 | Bourdon | 152/354 |
| 3,451,461 | 6/1969 | Wittneben | 152/356 |
| 3,500,888 | 3/1970 | Boilen | 152/356 |
| 3,623,528 | 11/1971 | Kovac et al. | 152/361 X |
| 3,671,542 | 6/1972 | Kwolek | 152/359 X |
| 3,690,363 | 9/1972 | Guyot | 152/359 |
| 3,789,900 | 2/1974 | Verdier | 152/356 |
| 4,067,374 | 1/1978 | Alden et al. | 152/354 R |
| 4,185,675 | 1/1980 | Greiner et al. | 152/354 R |

FOREIGN PATENT DOCUMENTS

| | | | |
|---|---|---|---|
| 447746 | 12/1972 | Australia. | |
| 489323 | 1/1977 | Australia. | |
| 391489 | 9/1965 | Switzerland | 152/361 R |

*Primary Examiner*—John T. Goolkasian
*Assistant Examiner*—Lois E. Boland

[57] ABSTRACT

A belted one-ply radial tire is disclosed which is characterized by a circumferential cord-fabric insert between the inner liner and the ply. The insert is of a material with good compressive fatigue resistance such as polyester cord. The single ply is continuous. The benefits of the high modulus radial ply cords are thus retained, and the disadvantages due to the poor compressive fatigue resistance of such cords are reduced or compensated for by the insert so that a durable one-ply radial tire with improved low rolling resistance is obtained.

3 Claims, 2 Drawing Figures

POLYESTER INSERTS IN SINGLE-PLY RADIAL TIRES

RELATED APPLICATIONS

This application is a continuation in part of application Ser. No. 835,383, filed Sept. 21, 1973, now abandoned.

BACKGROUND OF THE INVENTION

Field of the Invention

The rolling resistance of one-ply tires is believed to be superior to that of multiple ply tires. Because tires with low rolling resistance conserve energy, a one-ply tire is a desired form of tire.

An increasing proportion of the tires which are being manufactured today are one-ply radial tires. When certain materials which have high modulus but poor resistance to compression fatigue, such as fiberglass, spun steel wire and aramid, are used as the one ply of a radial tire, there is a tendency for the ply to break in the crown area. These breaks can lead to breaks in the inner liner and tire failure. This is believed to be caused by compressive forces from the pantographing action of the cincture belt of the tire.

By high modulus is meant an initial modulus of from 200 to 600 GPD/100% or higher. GPD/100% means grams force per denier at 100% elongation as determined by ASTM Procedure D885-76.

Radials are now predominantly two-ply construction but there is a trend toward one-ply for reasons of economy and also lower rolling resistance. The one-ply radial can be made with nylon or polyester body cords because of the good resistance to compression fatigue but there are advantages in using high modulus cords. The high modulus materials generally have low thermal shrinkage which contributes to good dimensional stability and also uniformity. Unfortunately, poor resistance to compression and compression fatigue accompanies the high modulus properties.

The trend is toward these high modulus materials and the invention is a way of getting around the problems which will probably be encountered in one-ply high modulus plies. This problem exists with Kevlar (aramid), fiberglass and fine filament steel cords, the biggest problem being with glass.

Radial tires are ordinarily made on special equipment but can be and are made on conventional equipment. We prefer to use radial tire equipment, however.

The problem of ply cord breakage in the crown of the tire probably would not occur in some prior art configurations. Examples of prior art where ply cord breakage would not occur in the crown area are those described by Bourdon in U.S. Pat. Nos. 2,493,614 (1950) and 3,192,984 (1965). What Bourdon does is to eliminate the center cord plies and replace them with a high modulus rubber. According to Bourdon this provides a softer ride and prevents, to some degree, noise transmission that would normally occur throughout the tire cords. A variation of the Bourdon theme is found in Australian Patent Specification No. 29,833/71 Guyot.

The Guyot patent specification is directed to a tire having carcass ply except in the crown area. In the crown area Guyot eliminates the carcass ply.

Some of the problems encountered with the prior art tires are as follows. The carcass of a radial tire is normally manufactured on a flat drum. It would appear that it would be easier for a tire builder to apply a single radial cord ply to the drum and center it rather than apply two relatively narrow partial plies, one on each side of the tire, and get them absolutely parallel. It would seem that force variations might exist around the circumference of a tire during use if the partial plies were not aligned properly.

Another problem which would occur is: during tire building, the tire carcass, as it is made on a flat drum, is expanded to a toroidal shape. If there was no carcass ply in the center of the tire but only an insert under the ply and the tire were expanded with an inflatable rubber bladder, the center of the carcass would expand as the cord ply would be pulled from the center due to cords sliding in the rubber. This is particularly true of the newer glass cords which have low cohesiveness to uncured rubber compound. The prior art tires discussed here are the Bourdon and Guyot tires.

Another problem with the Bourdon tires which eliminates carcass ply from the center of the tire is that of crack propagation. Bourdon replaces the strength of tire cords with high modulus rubber. When a crack forms in such a material, continued flexing of the tire will cause the crack to propagate through the rubber.

SUMMARY OF THE INVENTION

The object of the invention is to provide a continuous one-ply radial tire made from standard high modulus ply materials which has improved resistance to cord failure and performs as well as regular two-ply radial tires.

In accordance with the present invention, I provide at least one circumferential insert with good compression fatigue resistance, such as rayon, polyester or nylon tire cord material. Such materials can be characterized by a Goodrich Disk fatigue as determined in a Goodrich fatigue tester of 10.8 megacycles. The cord would not be expected to lose more than 35% of its breaking strength at 10.8 megacycles. The condition the machine would be running at are a compression of 6.3% and an elongation of 12.6% while the cord is embedded in rubber. In this way, I am able to build a one-ply radial tire which performs substantially as well as a two-ply tire, has lower rolling resistance, and has cost and manufacturing advantages.

In the practice of the present invention, all of the difficulties encountered in the practice of the Bourdon and Guyot inventions outlined above have been eliminated. In building the tire, according to the present invention, a single sheet made of glass cords and a center insert made of polyester cords can be used by the tire builder in constructing the tire. There is no problem expanding the carcass from a flat drum configuration to a toroidal shape because the carcass is reinforced across its entire width with continuous inextensible reinforcing cord. Also, when a circumferential crack starts in the continuous ply of the tire of the present invention, it can only propagate through the rubber and will not propagate through the cord reinforcement and the inner liner whereas it could propagate through an insert of high modulus rubber.

DESCRIPTION OF THE PREFERRED EMBODIMENTS

Figure 1:
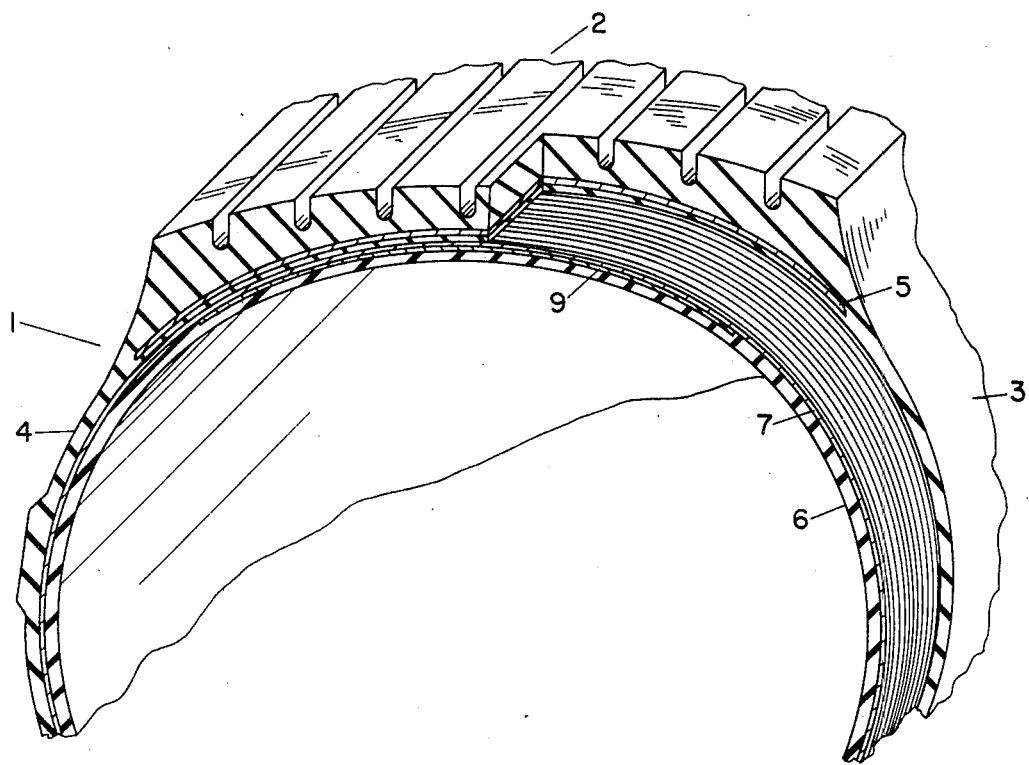
FIG. 1 is a partial perspective view, with portions broken away, of a continuous one-ply radial tire assembly according to the present invention.
Figure 2:
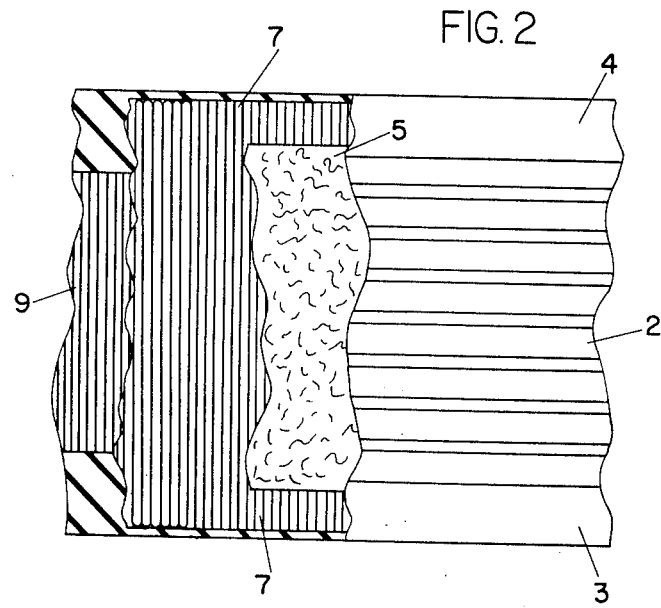
FIG. 2 is a plan view, with portions broken away, of the crown or top of the tire of FIG. 1.

One form of the invention is shown in FIGS. 1 and 2 which depict a one-ply tubeless radial tire 1 of generally toroidal shape with a tread or crown portion 2, sidewall portions 3 and 4, a circumferential belt or cincture assembly 5, a butyl rubber inner liner 6, and a single ply 7 of continuous parallel radial cords comprising a single continuous ply portion 7.

The single ply 7 is located next to the inner liner 6, ply portion 7 extending from one tire bead through the tread section to the other tire bead. The radial ply portions extend around the shoulder 13 of the tire, which is the junction of the tread and sidewall, and well inside the cincture belt 5. If the width of the tread on the road is five inches, for example, the width of the cincture belt is preferably about 5¾ inches.

In accordance with the invention, an insert sheet 9 is placed between the inner liner and the continuous radial body ply. The insert underlies the ply. The insert is made of conventional polyester tire cord fabric with good compression and fatigue resistance and preferably has a multiplicity of mutually parallel, continuous cords which are parallel to the radial ply cords and extends in width substantially from one shoulder of the tire to the other. It may be of the same width as the cincture belt 5 or somewhat smaller in width.

The cords of the radial plies are preferably made of fiberglass, other high modulus material commonly used in tire cords, such as steel wire or aramid fibers can be used. These high modulus materials particularly glass generally have poor compression fatigue resistance.

The cords of the insert sheet 9 are made of tire cord materials which have good compression fatigue resistance, such as nylon, rayon, polyester, PVA and other materials well known in the art for use in tire cords. The term "polyester" as applied to tire cord materials includes polyethylene terephthalate fiber. The term "PVA" means a polyvinyl alcohol fiber.

A tire with one continuous glass fiber radial ply having a polyester insert and a steel cincture belt was compared to a glass fiber two-ply radial tire with a steel belt in dynamic tire tests and performed well.

Corresponding tires were built having a center gap in the radial ply and were of inferior quality to the continuous ply tire. When glass cords made by current manufacturing methods were used to build tires having a center gap in the ply, they were too deformed to be used for test purposes. It is believed that the glass ply tires of the present invention are far superior to those of Guyot, because the Guyot tire cannot be made in conventional radial tire building equipment using glass cord currently available. This cord has insufficient cohesiveness to uncured rubber compound to prevent deformation in the building process.

The cords of the insert 9 are preferably parallel or very nearly parallel to the cords of the radial ply in order to obtain low rolling resistance. I believe, however, that the insert could also be a non-woven tire fabric sheet.

The mutually parallel cords of the radial ply and the insert are embedded in an elastomeric matrix as in conventional tire cord fabric as commonly used. These procedures are well known to those skilled in the art.

While the advantages of the invention principally accrue when the insert is employed in a continuous one-ply radial tire, it should be apparent that some benefits can be obtained with two-ply radial tires.

Obvious modifications which can be made relative to the foregoing description are intended to fall within the scope of the invention.

I claim:

1. In a radial pneumatic tire having a sidewall reinforcement consisting of a single one-piece ply of radial cord reinforcement extending from bead to bead selected from the class consisting of glass and aramid having an initial modulus greater than 200 GPD/100% embedded in an elastomeric matrix, an inner liner contiguous to said ply, and a cincture belt reinforcing the tread portion of the tire, the improvement comprising a circumferential insert sheet positioned between the inner liner and the ply and formed of a material having a break strength reduction of not more than 35% after 10.8 megacycles using Goodrich Disk fatigue test method, embedded in an elastomeric matrix and disposed under the radial center line around the tire between the radial ply and the inner liner, the insert having an axial width less than the axial width of the cincture belt, the insert sheet consisting essentially of reinforcing cords oriented in the same direction as the radial reinforcing cords of the one-piece ply.

2. The tire of claim 1 wherein the continuous ply is fiberglass.

3. The tire of claim 1 wherein the continuous ply is aramid.

* * * * *